(No Model.) 2 Sheets—Sheet 1.
W. M. MORSE.
VIBRATION ABSORBING DEVICE FOR BICYCLES.
No. 596,079. Patented Dec. 28, 1897.
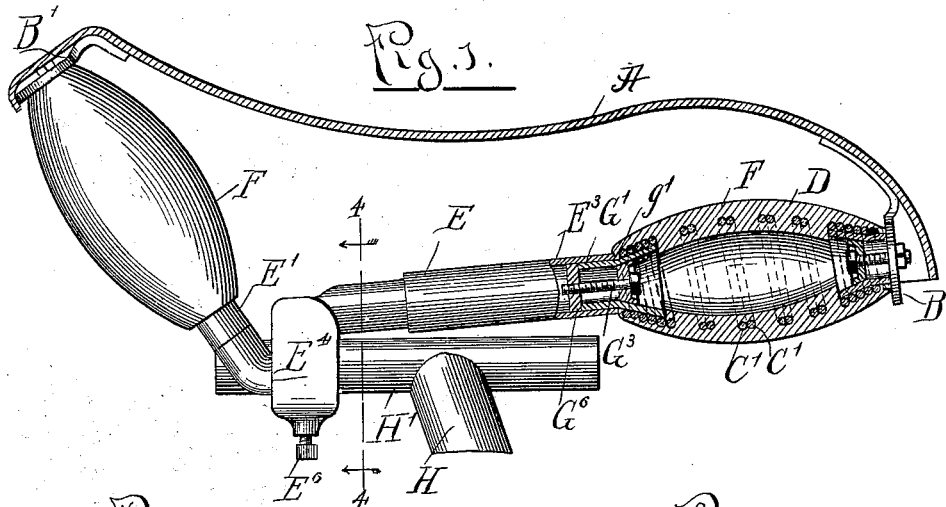
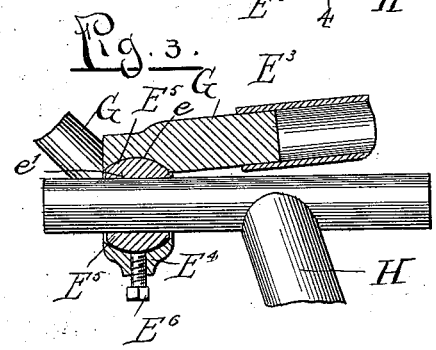
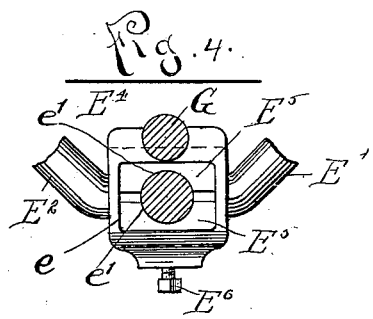
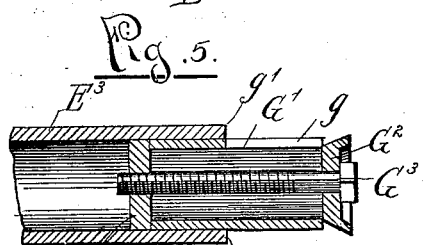
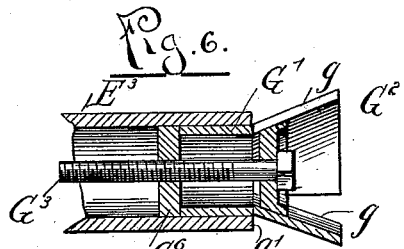
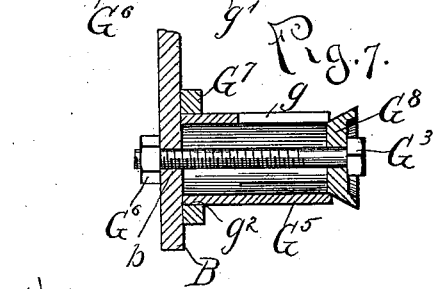
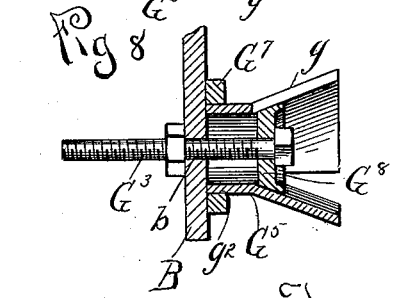
Witnesses:
Harry White
JB Keir
Inventor
William M. Morse
by Dayton ... Brown
his Attorneys (No Model.) 2 Sheets—Sheet 2.
W. M. MORSE.
VIBRATION ABSORBING DEVICE FOR BICYCLES.
No. 596,079. Patented Dec. 28, 1897.
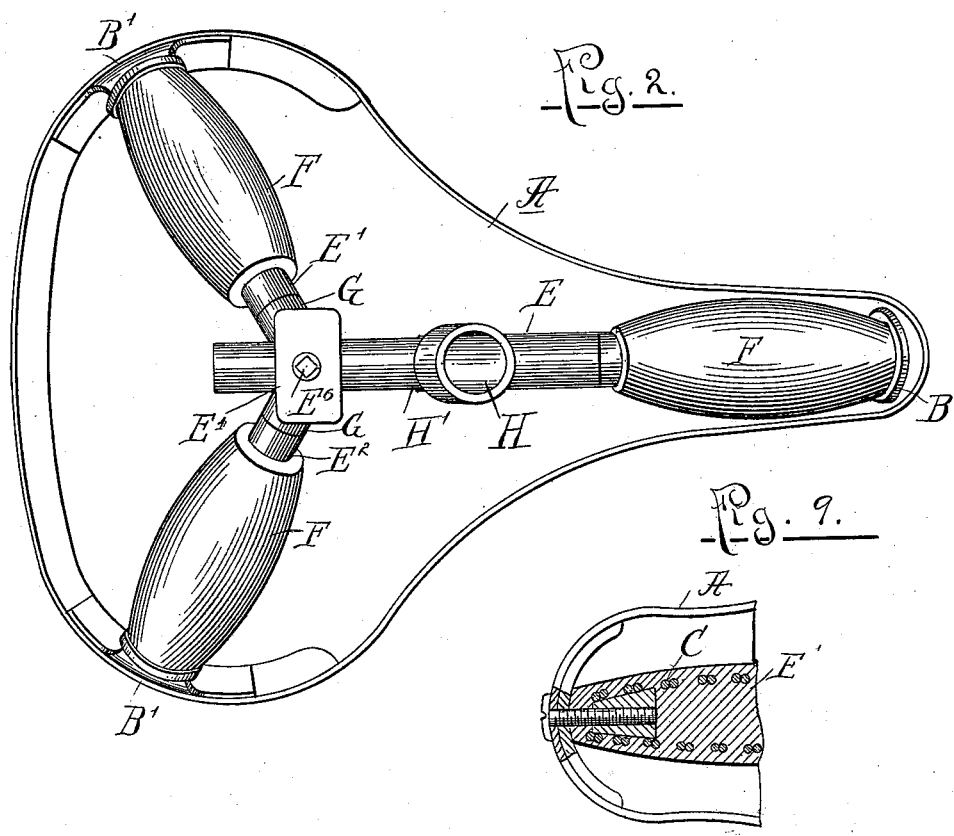
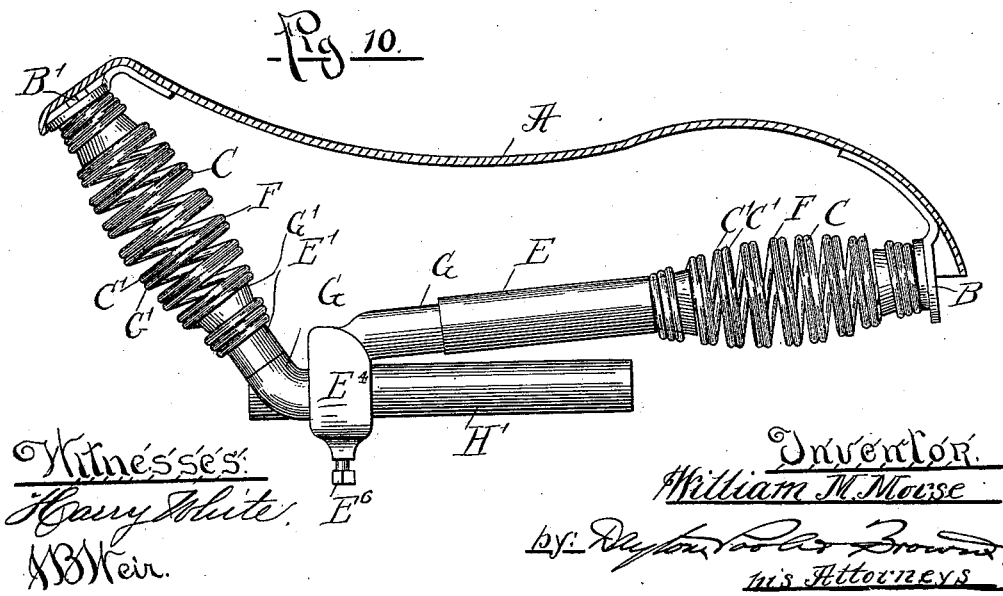

UNITED STATES PATENT OFFICE.

WILLIAM M. MORSE, OF CHICAGO, ILLINOIS.

VIBRATION-ABSORBING DEVICE FOR BICYCLES.

SPECIFICATION forming part of Letters Patent No. 596,079, dated December 28, 1897.

Application filed May 11, 1896. Serial No. 591,074. (No model.)

*To all whom it may concern:*

Be it known that I, WILLIAM M. MORSE, of Chicago, in the county of Cook and State of Illinois, have invented certain new and useful Improvements in Vibration-Absorbing Devices for Bicycles and other Vehicles; and I do hereby declare that the following is a full, clear, and exact description thereof, reference being had to the accompanying drawings, and to the letters of reference marked thereon, which form a part of this specification.

This invention relates to improvements in devices for absorbing the vibration of vehicles, so that a part supported through the medium of said devices will be to a greater extent relieved of the jar of the machine, the practical adaptation shown in the present instance consisting of an improved bicycle seat or saddle.

The object of the invention is to provide a comfortable saddle of simple, practicable, and light construction; and the invention consists in the matters hereinafter described, and more particularly pointed out in the appended claims.

The invention will be more readily understood by reference to the accompanying drawings, in which—

Figure 1 is a side elevation of a saddle embodying my invention, the front absorbing member being shown in axial section, as is the seat-covering. Fig. 2 is a bottom plan view of the same. Fig. 3 is a central longitudinal detail of the clip and parts connected therewith by means of which the saddle is connected to the seat-post. Fig. 4 is a transverse vertical sectional view taken on line 4 4 of Fig. 1. Fig. 5 is an enlarged axial sectional view of the supporting-stud by means of which the absorbing device is connected with the main frame. Fig. 6 is a view showing the same expanded. Figs. 7 and 8 are views similar to Figs. 5 and 6, respectively, showing the form of construction employed for securing the outer ends of the coils to the pommel and cantle plates of the saddle. Fig. 9 is a fragmentary detail of the front end of the saddle and front supporting-coil, showing a modification. Fig. 10 is a side elevation, the seat-covering being shown in central vertical section, of still another modification.

Stated in general language, the invention consists, essentially, in providing a construction wherein the parts to be carried are supported by means of one or more vibration-absorbing devices, each consisting of an elongated or helically-coiled spring, which in the most improved form of the invention is enveloped throughout its length with a homogeneous mass of yielding material, preferably vulcanized rubber, and which is connected with a rigid part of the machine—*i. e.*, a part subject to vibration—by means of a stud, with which the end of the coil is connected in such manner as to extend in prolongation of the stud. The part to be carried is connected with the vibration-absorbing device at a point remote from the point of attachment of the latter with the rigid part of the machine and in such manner that the weight to be carried will come upon the device in a direction practically at right angles to its longitudinal axis or, in other words, so that the weight will exert a flexing strain upon the device. Obviously the details of such a construction may be varied to a considerable extent; but I have herein shown two simple and practicable embodiments of the invention in a bicycle-saddle.

As shown in Figs. 1 to 8, inclusive, the saddle embraces a main-frame piece or longitudinally-extending center bar E, provided at its rear with divergent arms E' E². Upon the forward end of the bar E and upon the end of each of the arms E' E² are mounted vibration-absorbing devices (each designated as a whole by F) arranged to carry the parts of the saddle constituting the seat proper, the said vibration-absorbing devices being so connected with the center bar as to form, in effect, extensions of the several parts thereof, upon the outer ends of which the seat proper is mounted.

Describing the vibration-absorbing devices in detail, all of which are alike in construction, each of the several ends of the member E is provided with an axially-extending rigid stud G, mounted thereon. In the present instance the extreme end portions of each bar member of the saddle-frame consist of a sleeve or section of tubing E³, suitably secured upon the cast central body. Within the ends of the hollow sockets thus formed are inserted short tube-sections G', the projecting ends of which form the studs proper. Said sections are of such external diameter as to fit tightly therein and are secured by brazing or otherwise. The parts G' are each provided with a plurality of longitudinally-extending slits $g\ g$, extending inwardly from their outer ends the full length of the projecting part of the stud-section, so that said projecting end may be expanded into outwardly-flaring form. In order to expand the stud, a nut or heavy washer $G^2$, having a flaring perimeter and of a diameter larger than the interior of the tube, is arranged to be forced or drawn into the split end by means of a bolt $G^3$, which extends through the washer and engages a nut $G^6$, which acts against the inner end of the stud-section. Upon the stud is mounted the end of a helical coil C of spring-wire, preferably steel and also preferably of elongated oval form. The stud G is made short relatively to the length of the coil C, so as to extend but a short distance within the latter, which is wound upon a suitable form or mandrel, so as to conform in its interior to the shape of the expanded stud, thereby insuring an accurate fit and rigid connection between the parts. The oval coil C may consist of a single strand of wire or of a plurality of strands, as found most desirable. In the present instance I have shown the coil as made duplex, consisting of two strands C' C', arranged to lie closely adjacent to and parallel with each other throughout their length, but formed into an open coil—i. e., having substantial spaces between the several turns of the coil. That part of the coil, however, which envelops the stud is wound closely together, and the extreme end of the coil is arranged to abut directly against the annular shoulder $g'$, formed by the end of the outer socket $E^3$. The other end of the coil C is connected with the pommel-plate B (assuming that we are speaking of the front member F) of the saddle by means of a tubular stud $G^5$ generally similar to that heretofore described, but which is arranged to abut at its end $g^2$ directly against the inner face of said plate B instead of being inserted within a socket. The unsplit portion of the stud, or that which remains cylindric, is encircled with a collar $G^7$ and the bolt $G^3$, by means of which the expanding washer $G^8$ is arranged to extend through a threaded aperture $b$ in the said pommel-plate B.

After the coil C has been properly formed I preferably cover it throughout its length with a suitable resilient and yielding cover D, usually of rubber formed in a mold, so as to give the desired uniformity of covering over the oval exterior of the coil. The rubber covering D is arranged to envelop the coil C, both exteriorly and interiorly, to a considerable thickness, so as to form a continuous flexible body or mass, which aids effectively in absorbing vibrations transmitted to the coil from the member E.

In the preferred form herein shown the rubber is left partially hollow throughout its length, so as to afford access to the bolt G by means of a suitable tool. It will of course be understood that the rubber D will be vulcanized in its molded form upon the coil.

The rear vibration-absorbing devices F F of the saddle are connected with the cantle-plate B' in the same manner as the front member is connected with the pommel-plate.

The outer frame of the saddle may obviously be covered in any usual or preferred manner, the covering herein shown consisting of an ordinary leather seat A of common form and construction.

The saddle is adjustably connected with the T-head or horizontal top bar H' of the seat-standard H by means of an improved clamping-clip constructed as follows: $E^4$ designates a depending clip-body cast integral with the bar members E and provided with a transversely parti-cylindric cavity $e$, adapted to receive a pair of correspondingly-shaped clamping-blocks $E^5\ E^5$. The proximate face of each block $E^5\ E^5$ is provided with a semicircular groove $e'$, which together form a cylindric opening between the clamping-blocks adapted to receive the horizontal bar H' of the seat-standard. $E^6$ designates a set-screw tapped through the lower side of the clip and arranged to impinge against the back of the lower clamping-block E, and by means of which the saddle may be clamped rigidly upon the seat-standard.

Obviously by means of the foregoing construction the saddle may be tilted forward or backward to any desired angle with the greatest facility. It will be further obvious that with the construction described it will be impossible for the clamping-blocks to become displaced or to drop out until the horizontal bar of the seat-standard has been entirely removed.

In Fig. 10 I have shown a modification in which the vibration-absorbing device is constructed and connected with the bar members in the same manner as that shown in Fig. 1; but in this instance the rubber covering of the coil C' is dispensed with. Such a construction is not deemed as desirable as the one in which the rubber is employed, yet nevertheless it possesses a valuable degree of efficiency in absorbing the vibration.

In Fig. 9 I have shown a fragmentary view of still another modification. In this instance the body, of rubber, enveloping the coil is made solid throughout, and in order to afford means for securing the device to the frame of the saddle a conical nut is arranged to fit tightly within the end of the coil and provided with a threaded aperture which is engaged by a bolt passed through the frame. The length of the nut and the size of the bolt will be such as to afford a rigid support for the coil.

While I have herein shown what I deem to be a preferred embodiment of the invention, yet it will be obvious that various modifications in the details thereof may be made without departing from the spirit of the invention and without involving more than ordinary mechanical skill. I do not therefore wish to be limited to the precise details shown, except as made the subject of specific claims.

I claim as my invention—

1. The combination with a bicycle-frame, and a part to be supported thereon, of elastic supporting means, comprising an open-coiled wire spring rigidly attached at one end to the machine-frame and at its opposite end to the part to be supported, said spring having its central axis disposed transversely with respect to the direction in which pressure is applied to the part to be supported, and a mass of yielding material enveloping said spring both exteriorly and interiorly.

2. The combination with one of the main supporting members of a bicycle-saddle having at its end a tubular stud or socket, of means for supporting the seat of a saddle thereon comprising a hollow tubular stud secured in said socket, an elongated oval-coiled spring having its central axis disposed transversely to the line of pressure thereon within one end of which the tubular stud is expanded, means for connecting the opposite end of the coil to the seat of the saddle, and a mass of rubber enveloping the coil both exteriorly and interiorly.

3. A bicycle-seat frame comprising a central frame member provided with a plurality of divergent arms, an elongated open-coiled wire spring upon the end of each of said arms arranged to extend in prolongation of the latter and an outer frame supported upon the outer ends of said coils.

4. A bicycle-seat frame comprising a central frame member provided with a plurality of divergent arms each provided at its ends with a rigid stud, an elongated oval-coiled wire spring mounted upon each of said studs and arranged to extend in prolongation of the arm and an outer frame supported upon the outer ends of said coiled springs.

5. The combination with a velocipede-saddle, of an attaching-clip comprising a clip-body provided with a cavity having curved interior walls, a pair of clamping-blocks adapted to fit within said cavity each of said blocks having one of its sides curved to conform to the curvature of the cavity and its opposite side adapted for a seat-standard, and a set-screw tapped through the wall of the clip-body and arranged to act upon one of said clamping-blocks to clamp it against the seat-standard member.

6. The combination with a velocipede-saddle, of an attaching-clip comprising a clip-body provided with a cavity having curved interior walls, a pair of clamping-blocks adapted to fit within said cavity each having one side curved to conform to the curvature of the cavity and its opposite side grooved for the reception of a seat-standard and a set-screw tapped through the wall of the clip-body and arranged to act upon one of said clamping-blocks.

7. The combination with a velocipede-saddle, of an attaching-clip comprising a clip-body provided with a parti-cylindric cavity having curved interior walls, a pair of clamping-blocks adapted to fit within said cavity each having one side of cylindric form to conform to the curvature of the cavity and its opposite side grooved for the reception of a seat-standard and a set-screw tapped through the wall of the clip-body and arranged to act upon one of said clamping-blocks.

In testimony that I claim the foregoing as my invention I affix my signature, in presence of two witnesses, this 9th day of May, A. D. 1896.

WILLIAM M. MORSE.

Witnesses:
TAYLOR E. BROWN,
WILLIAM L. HALL.